Feb. 14, 1939.    C. S. REED    2,147,611
STRUCTURAL MEMBER FOR SEAT CONSTRUCTION AND THE LIKE
Filed March 4, 1937
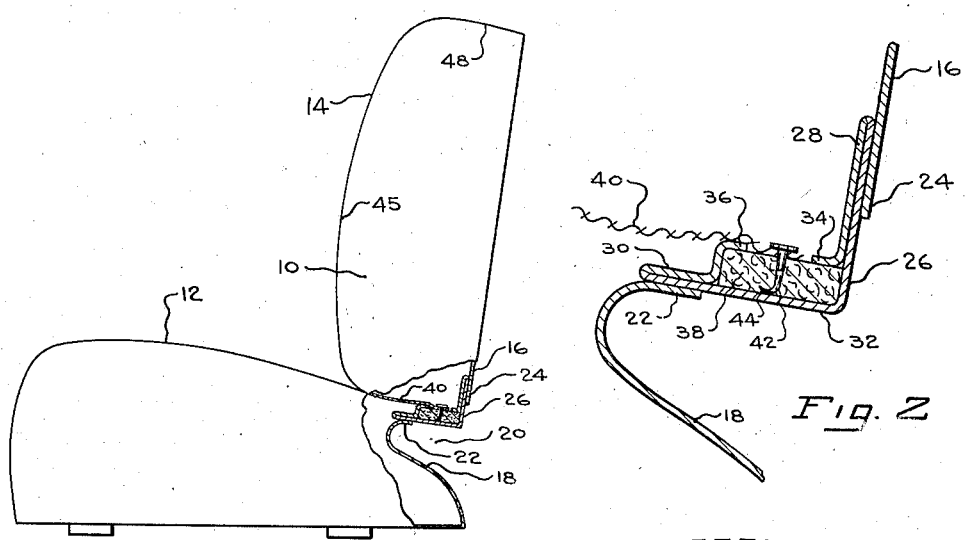
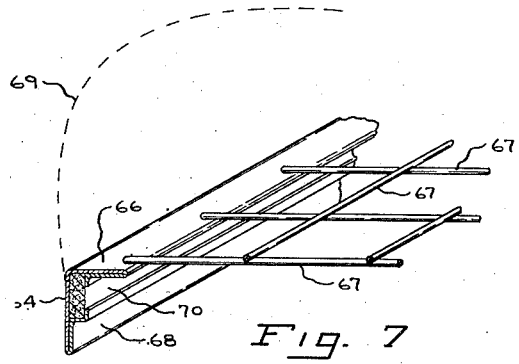
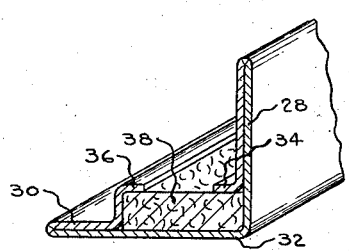
Fig. 3
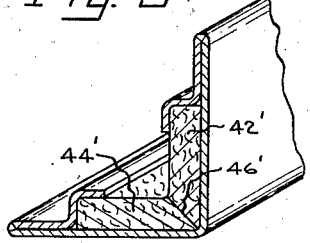
Fig. 4
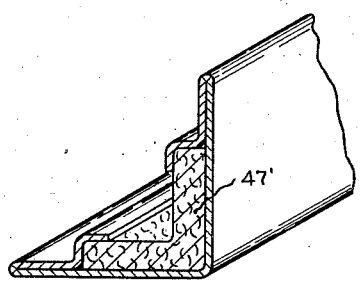
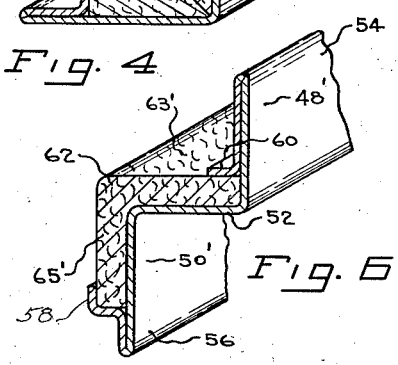
Fig. 6
CLAIR S. REED, Inventor
By Beaman & Langford, Attorney Patented Feb. 14, 1939

2,147,611

UNITED STATES PATENT OFFICE 2,147,611

STRUCTURAL MEMBER FOR SEAT CONSTRUCTION AND THE LIKE

Clair S. Reed, Jackson, Mich., assignor to Reynolds Spring Company, Jackson, Mich., a corporation of Delaware Application March 4, 1937, Serial No. 128,932

2 Claims. (Cl. 155—184)

The present invention relates to improvements in seat and cushion spring construction; being particularly concerned with rolled composite structural members of fiber and metal which serve the additional function of providing a structure to which the upholstery may be tacked or otherwise secured.

With the present rapid adoption of welding bars and sheet metal structure in seat and cushion spring constructions, available welding surfaces as well as tacking surfaces for the upholstery are essential. The present invention is especially well adapted for location between two sheet metal parts of the seat construction and provides a tacking surface in the most desired location for upholstering the back cushion. Several different cross-sectional modifications of the structural member are illustrated as well as the use of the structural member in the construction of the base frame of cushion spring structures.

Accordingly, one of the objects of the invention is to provide an improved seat construction for automobiles and the like having as a structural part thereof a double flange angular composite sheet metal and fiber member disposed at the junction of the seat back and foot support.

Another object is to provide an improved structural part in the form of a composite sheet metal and fiber member having longitudinal flanges bordering a multi-ply sheet metal and fiber elongated section.

These and other objects and advantages residing in specific detail of construction will be more fully set forth in the following description. The invention is defined by the annexed claims.

In the drawing,

Fig. 1 is a side elevational view of an upholstered seat construction partially shown in cross-section, Fig. 2 is a fragmentary cross-sectional view of a portion of the construction shown in Fig. 1, Fig. 3 is a fragmentary cross-sectional view of the structural member, Figs. 4, 5 and 6 are cross-sectional views of different embodiments of the structural member, and Fig. 7 is a fragmentary perspective view of a cushion spring structure.

Referring to Fig. 1, an adjustable front seat 10 of an automobile is shown in side elevation and comprises an upholstered bottom cushion 12 and back cushion 14. Each of the cushions 12 and 14 contain coil springs (not shown) covered with padding in a well known manner. The frame of the seat 10 includes a rear sheet metal panel 16 and a rear base portion 18 of sheet metal of angular construction to provide additional leg room at 20 and a foot rest for the rear seat occupants. In practice the base portion 18 will be carpeted while the rear panel 16 is upholstered to match the back cushion 14. Connected to the upper edge 22 of the base 18 and the lower edge 24 of the panel 16 is a transverse composite structural member 26 of sheet metal and fiber. The member 26 is equipped with flanges 28 and 30 which are continuations of the L-shaped portion 32; the flange being of double thickness with further bent portions 34 and 36 overlapping the fiber strip 38, preferably of twisted paper. As more clearly shown in Fig. 2, the edges 22 and 24 are welded to the flanges 28 and 30 making the elements 16, 18 and 26 into an integral framework. Obviously, in lieu of welding other equivalent securing matter may be used as for example, riveting, bolting and the like. In the manufacture of the structural member 32 in the quantity required for automobile production, the metal and fiber will be rolled together into the final shape shown in Fig. 2.

To upholster the back cushion 14, the fabric 40 is first tacked to the fiber strip 38 by tacks 42, the metal section 32 acting to turn the end 44 of the tack 42 in a well known manner. The fabric 40 is then drawn up over the front 45 and top 48 of the cushion 14 and secured in any suitable usual way to the back frame of the seat 10.

A modified structural member is shown in Fig. 4 in which an additional tacking surface is provided by having an L-shaped fiber section. The fiber section may be made up from two sections 42' and 44' having abutting edges meeting at 46'. In Fig. 5 is shown a similar modification in which the L-shaped fiber section 47' is of integral construction. An especially rigid member is shown in Fig. 6 having a very exposed L-shaped fiber section. The metal structure has portions 48' and 50' connected by the web 52, the portions 48' and 50' being folded upon themselves to provide flanges 54 and 56 with edges 58 and 60 overlapping the L-shaped fiber section 62 to hold the same to the portions 50' and 52. As will be clearly understood, the exposed surfaces 63' and 65' of the fiber section 62 provide available tacking surfaces in two different planes.

In Fig. 7 a structural member 64 corresponding to that of Fig. 3 is shown used as a frame part in a cushion spring construction. The flanges 66 provide a suporting ledge to which the cross member 67 may be welded for supporting the coil springs (not shown). The presence of the flange 68 gives the appearance of depth to the cushion when the upholstery 69 is drawn down over the front of the cushion and member 64 and tacked to the innerside of the fiber strip 70.

From the foregoing description it should appear that an improved structural member for seat and spring structure has been provided which offers both welding and tacking surfaces for construction and upholstering. As the structural member is capable of being inexpensively rolled in continuous lengths in large quantities, it is particularly adaptable for use in present day automobile production.

Having described my invention what I desire to protect by Letters Patent and claim is:

1. As an article of manufacture a composite structural element for use in seat frame fabrication and the like, comprising a sheet metal covering having a strip of fibrous material inserted therein, said covering having a body portion having angularly related sides and flanges extending from the body portion beyond the edges of the fibrous insert, said flanges having means confining the insert against said sides, said covering having an opening portion exposing the fibrous strip to present a tacking surface.

2. In a seat construction, the combination with a back panel and a base located below the back panel, of a composite sheet metal and fibrous structural element inserted between said panel and base, said element comprising a sheet metal covering having a strip of fibrous material inserted therein, said covering having a body portion having angularly related sides and flanges extending from the body portion beyond the edges of the fibrous insert, said flanges having means confining the insert against said sides, said covering having an open portion exposing the fibrous strip to present a tacking surface, one of said flanges being connected to said base and the other of said flanges being connected to said back panel in support thereof, said exposed portion presenting a tacking area for the upholstery of the seat construction.

CLAIR S. REED.